US012668686B2

(12) United States Patent
Lelio et al.

(10) Patent No.: US 12,668,686 B2
(45) Date of Patent: Jun. 30, 2026

(54) METHOD FOR MANUFACTURING ASPHALT COMPRISING RUBBER FROM END-OF-LIFE TIRES

(71) Applicant: Bridgestone Europe NV/SA [BE/BE], Zaventem (BE)

(72) Inventors: Luca Lelio, Rome (IT); Massimo Losa, Rome (IT); Pietro Leandri, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 652 days.

(21) Appl. No.: 18/035,677

(22) PCT Filed: Nov. 5, 2021

(86) PCT No.: PCT/EP2021/080745
§ 371 (c)(1),
(2) Date: May 5, 2023

(87) PCT Pub. No.: WO2022/096635
PCT Pub. Date: May 12, 2022

(65) Prior Publication Data
US 2023/0407061 A1 Dec. 21, 2023

(30) Foreign Application Priority Data

Nov. 6, 2020 (IT) ........................ 102020000026533

(51) Int. Cl.
| | |
|---|---|
| *C08L 17/00* | (2006.01) |
| *B09B 3/40* | (2022.01) |
| *C08K 7/26* | (2006.01) |
| *C10B 53/07* | (2006.01) |
| *B09B 101/80* | (2022.01) |

(52) U.S. Cl.
CPC ............... *C08L 17/00* (2013.01); *B09B 3/40* (2022.01); *C08K 7/26* (2013.01); *C10B 53/07* (2013.01); *B09B 2101/80* (2022.01); *C08L 2207/24* (2013.01)

(58) Field of Classification Search
USPC .......................................................... 521/45
See application file for complete search history.

(56) References Cited

FOREIGN PATENT DOCUMENTS

| | | | | |
|---|---|---|---|---|
| CN | 101747637 A | 6/2010 | | |
| CN | 102250475 A | 11/2011 | | |
| CN | 103930491 A | 7/2014 | | |
| EP | 0952188 A1 | 10/1999 | | |
| KR | 100669079 B1 | 1/2007 | | |
| KR | 20200096940 A | * 8/2020 | .............. | C08L 19/00 |
| WO | 2019135815 A1 | 7/2019 | | |
| WO | 2020135815 A1 | 7/2020 | | |
| WO | WO-2020180208 A1 | * 9/2020 | ............. | C04B 26/26 |
| WO | 2022096635 A1 | 5/2022 | | |

OTHER PUBLICATIONS

Kumar Kaliyavaradhan et al. , Waste resources recycling in controlled low-strength material (CLSM): A critical review on plastic properties Journal of Environmental Management vol. 241, Jul. 1, 2019, pp. 383-396 (Year: 2019).*
KR 20200096940 A Machine Translation (Year: 2020).*
WO2020180208A1 Machine Translation (Year: 2019).*
Chinese Search Report, corresponding application No. CN116390984A, Jun. 4, 2025, 3 pages.
PCT International Search Report, Jan. 19, 2022, 4 pages.

* cited by examiner

*Primary Examiner* — Terressa Boykin
(74) *Attorney, Agent, or Firm* — Patterson Intellectual Property Law, PC

(57) ABSTRACT

A method for producing asphalt comprising a heat treatment step, wherein the rubber granules deriving from an end-of-life tyre granulation process are subjected to a temperature of between 80 and 300° C., for a period of time necessary in order to obtain rubber granules with a density of between 1.0 and 1.5 g/cm³; and a mixing step wherein the rubber granules from the heat treatment step are mixed with stone aggregate and bitumen in order to obtain asphalt.

16 Claims, No Drawings

METHOD FOR MANUFACTURING ASPHALT COMPRISING RUBBER FROM END-OF-LIFE TIRES

The present invention relates to a method for using rubber deriving from end-of-life tires in the preparation of asphalt.

Herein and hereinafter, the term asphalt refers to the bituminous conglomerate used for the construction of road pavements.

Generally, road asphalt is composed of about 94% stone aggregates and about 6% bitumen.

The use of rubber from exhausted tires (PFU) or end-of-life tires has been known for some time (henceforth the English wording ELT, the acronym for end-of-life tire, will be used). The use of ELT rubber, in addition to representing an advantage in environmental terms by using waste material, also offers advantages in terms of reducing the rolling noise that is generated by dynamic tire-pavement contact.

The solutions implemented to date imply two usage methods for the rubber powder from ELT. One method, commonly known as "dry" technology, implies the addition of the powder directly to aggregates and bitumen during the mixing step of the bituminous conglomerate, with powder dosages ranging between 1-2% by weight in relation to the mixture. The other method, commonly known as "wet" technology, implies that the bitumen and powder are mixed and left to react at a temperature such as to allow the rubber particles to swell, thereby obtaining that which is indicated with the English wording Crumb Rubber Modified Binder (CRMB); the quantity of powder to be introduced into the CRMB varies between approximately 15 and 22% in relation to the weight of the bitumen.

Considering that, according to these known techniques of the art, the powder used with the "dry" and "wet" technologies represents only about 2% by weight of the asphalt, it is clear that, according to the solutions implemented to date, the quantity of ELT rubber that can be used in asphalt is very low. Such a limitation, in addition to representing an obstacle to significant recycling of the ELT rubber in asphalt, excludes the possibility of investigating what could be the possible performance advantages of asphalt deriving from a greater ELT rubber presence.

The need was therefore felt to be able to use ELT rubber within asphalt in a greater quantity than that allowed for by the aforementioned techniques of the known art.

The inventors of the present invention have developed a solution that makes it possible to satisfy the aforementioned need by treating ELT rubber in such a way as to be able to use it as an inert material, as a partial replacement for stone aggregate and, therefore, overcoming the need to dissolve it in bitumen for the production of CRMB.

The object of the present invention is a method for producing asphalt comprising a heat treatment step, wherein the rubber granules deriving from an end-of-life tire granulation process are subjected to a temperature of between 80 and 300° C., preferably between 100 to 200° C., for a period of time necessary in order to obtain rubber granules with a density of between 1.0 and 1.5 g/cm$^3$, preferably of between 1.2 and 1.3 g/cm$^3$; and a mixing step wherein the rubber granules from the heat treatment step are mixed with stone aggregate and bitumen in order to obtain asphalt.

Preferably, said mixing step comprises a first mixing operation wherein the stone aggregate and the bitumen are mixed together at a temperature of between 150 and 200° C., and a second mixing operation wherein the rubber granules are added to the mixture from the first mixing operation.

Such a mixing sequence ensures better granule distribution within the resulting asphalt.

Preferably, the rubber granules from the heat treatment step constitute from 1 to 30% by volume of the quantity of inert material comprised within the asphalt.

Herein and hereinafter the term inert material refers to the combination consisting of stone aggregate and ELT rubber granules.

Preferably, the rubber granules deriving from the granulation process have a substantially polyhedral conformation wherein the ratio between the maximum size and the minimum size is less than 2.

In fact, it has been found that granules having three dimensions that are similar therebetween give better results.

Preferably, the rubber granules deriving from the granulation process have dimensions such as to pass through a sieve having meshes with dimensions of between 10 mm and 1.5 mm; more preferably having meshes with dimensions of between 2.0 mm and 6.0 mm.

Preferably, the method comprises a preliminary thermal step preceding said heat treatment step and wherein the rubber granules deriving from an ELT granulation process are subjected to a temperature of between 120 and 200° C. for a period of time of between 15 and 30 h.

Preferably, the method comprises a surface treatment step subsequent to said heat treatment step and wherein the rubber granules from the heat treatment are subjected to a surface abrasion operation.

By means of the abrasion operation a powder is obtained that achieves greater compaction of the asphalt. Furthermore, it is considered by the inventors to be extremely important that this powder should originate from the outer layer of the pretreated rubber granules.

Preferably, the method comprises a final heat treatment step, subsequent to said surface treatment step, and preceding said mixing step; during said final heat treatment step, the rubber granules deriving from a surface treatment process are subjected to a temperature of between 80 and 300° C., preferably between 100 and 200° C., for a period of time necessary in order to obtain rubber granules with a density of between 1.0 and 1.5 g/cm$^3$, preferably between 1.2 and 1.3 g/cm$^3$.

A further object of the present invention relates to rubber granules and/or powder deriving from an end-of-life tire granulation process which have dimensions such as to pass through a sieve having meshes with dimensions of up to 10 mm and subjected to a temperature of between 80 and 300° C. for a period of time necessary in order to obtain rubber granules and/or powder with a density of between 1.0 and 1.5 g/cm$^3$, preferably of between 1.2 and 1.3 g/cm$^3$.

Preferably, said granules and/or powder are subjected to a preliminary thermal step preceding said heat treatment step and wherein the rubber granules and/or powder deriving from an ELT granulation process are subjected to a temperature of between 120 and 200° C. for a period of time of between 15 and 30 h.

Preferably, said granules and/or powder are subjected to a surface treatment step subsequent to said heat treatment step and wherein the rubber granules and/or powder from the heat treatment are subjected to a surface abrasion operation.

Preferably, said granules and/or powder are subjected to a final heat treatment step subsequent to said surface treatment step; during said final heat treatment step, the rubber granules and/or powder deriving from a surface treatment process are subjected to a temperature of between 80 and 300° C., preferably between 100 and 200° C., for a period of time necessary in order to obtain rubber granules and/or powder with a density of between 1.0 and 1.5 g/cm³, preferably between 1.2 and 1.3 g/cm³.

The rubber powder has a maximum diameter of 1.5 mm.

The following are non-limiting embodiments shown purely by way of illustration.

Two bituminous conglomerate mixtures according to the present invention were produced.

The two conglomerates differ therebetween according to the type of treatment to which the rubber granules deriving from ELT were subjected. In particular, the first bituminous conglomerate mixture was obtained using rubber granules subjected to heat treatment only, while the second bituminous conglomerate mixture was obtained using rubber granules subjected to both the thermal treatment and to a mechanical surface treatment.

In the following examples, the basalt material has a maximum diameter of 8 mm; the fine gravel material has a maximum diameter of 6 mm; the basalt sand material has a maximum diameter of 4 mm; the filler material and reinforcing fibers must meet the requirements shown below within the respective tables.

Requirements for the Filler

| Quality indicators | | | | Category |
|---|---|---|---|---|
| Parameter | Standard | Unit of measurement | Value | UNI EN 13043 |
| Sieve passage 0.125 mm | UNI EN 933-1 | % | 100 | — |
| Sieve passage 0.063 mm | UNI EN 933-1 | % | ≥80 | — |
| Plasticity Index | UNI CEN ISO/TS 17892-12 | % | N.A. | — |
| Rigden voids | UNI EN 1097-4 | % | 28-45 | $V_{28/45}$ |
| Stiffening Power | UNI EN 13179-1 | ° C. | 8-16 | $\Delta_{R\&B}8/16$ |

Reinforcing Fiber Requirements

| | |
|---|---|
| Length (μm) | 200 ÷ 6000 |
| Diameter (μm) | 8 ÷ 20 |
| Tensile strength (GPa) | 1.5 ÷ 3.0 |
| Maximum elongation (%) | 1.0 ÷ 3.0 |
| Melting point (° C.) | >300 | first bituminous conglomerate mixture

Granules with dimensions of between 2.5-4.0 mm were taken from a rubber deriving from ELT granulation process.

These granules were subjected to a heat treatment step at atmospheric pressure in a static laboratory oven according to the following sequence:

24 h time at 175° C.;

10 h time at 250° C. with periodic mixing of the material every hour.

The granules deriving from the heat treatment described above have a density>1.25 g/cm³.

During the treatment at 250° C., periodic checks were carried out both of the density and of the water absorption.

The rubber granules produced as described above were used for the preparation of the bituminous conglomerate mixture.

Table I shows the composition of the inert material of the first bituminous conglomerate mixture both in % by volume and in % by weight.

TABLE I

| | basalt | Basalt sand | Limestone filler | Pre-treated ELT granules |
|---|---|---|---|---|
| % in volume | 51.0 | 21.0 | 8.0 | 20.0 |
| % by weight | 57.3 | 23.6 | 8.7 | 10.4 |

As will be described hereinafter, the bituminous conglomerate mixture also includes bitumen in an amount equal to 8% by weight with respect to 100% by weight of the inert material.

The procedure for preparing the bituminous conglomerate mixture will be described below.

The basalt, basalt sand and bitumen were heated, each separately from the other ingredients, until reaching 165° C. Once a temperature of 165° C. was reached, the aforementioned ingredients were placed into a mixer, which was subsequently operated at a speed of about 80 rpm. After about one minute of mixing, the reinforcing fibers were added. After about one minute of mixing, the filler was added. After about one minute of mixing, the pre-treated ELT granules were added. After about one minute, the preparation was terminated.

Part of the mixture was used immediately in order to determine the maximum density (according to UNI EN 12697-5)

For the preparation of the specimens, the material mixed at a temperature of 165° C. was subjected to a thickening process by means of a rotary press (50 revolutions of the rotary press).

At the end of the thickening, the specimen was removed from the dies and allowed to cool to room temperature.

After 24 hours, the specimen was cut according to the specifications in order to be subjected to subsequent mechanical tests (ITS, ITSR, CTI).

The parameters that were studied were:

ITS parameter for the evaluation of mechanical resistance (UNI EN 12697-23).

ITSR parameter for evaluating sensitivity to water (UNI EN 12697-12).

CTI parameter for evaluating the deformability index (UNI EN 12697-23).

Table II shows the results obtained for the values of the aforementioned parameters.

TABLE II

| ITS (MPa) | CTI (MPa) | ITSR (%) |
|---|---|---|
| 0.44 | 11.9 | 75 |

Table III shows the values of the volumetric characteristics as a function of the revolutions of the rotary press.

In particular, the volumetric characteristics investigated were: percentage of voids (% Vv), percentage by volume of bitumen (% Vb), percentage by volume of aggregates (% Vag), percentage of voids within the dry mixture (% VMA), percentage of voids filled with bitumen (% VFA), real density of the sample (Gmb), maximum density (Gmm) and degree of thickening (% Gmm).

TABLE III

| no. of revolutions | % Vv | % Vb | % Vag | % VMA | % VFA | Gmb (g/cm³) | Gmm (g/cm³) | % Gmm |
|---|---|---|---|---|---|---|---|---|
| 10 | 17.7 | 13.1 | 69.2 | 30.8 | 42.4 | 1.815 | 2.207 | 82.26 |
| 50 | 12.0 | 14.0 | 74.1 | 25.9 | 53.9 | 1.943 | 2.207 | 88.04 |
| 130 | 9.4 | 14.4 | 76.2 | 23.8 | 60.4 | 1.999 | 2.207 | 90.57 | second bituminous conglomerate mixture

Granules with dimensions of between 2.5-4.0 mm were taken from a rubber deriving from ELT granulation process.

These granules were subjected to a first heat treatment step wherein the granules were subjected to a temperature of 150° C. for a period of time of 48 h in a static oven at atmospheric pressure.

The granules from the first heat treatment step were subsequently subjected to a surface treatment step in order to increase the specific surface area of the granules themselves. During the surface treatment step, the granules were passed five times through two course horizontal axis rollers (P40 sandpaper) of a "Molino" machine.

The granules from the surface treatment step were subsequently subjected to a final heat treatment step wherein, in a static oven at atmospheric pressure, the granules were subjected to a temperature of 150° C. for a period of time of 120 h until reaching a granule density equal to 1.26 g/cm³.

During the final heat treatment step, periodic checks were performed, both of the density and of the water absorption.

The rubber granules produced as described above were used for the preparation of the bituminous conglomerate mixture.

Table IV shows the composition of the inert material of the second bituminous conglomerate mixture both in % by volume and in % by weight.

TABLE IV

| | basalt | Fine gravel | Basalt sand | Limestone filler | Pre-treated ELT granules |
|---|---|---|---|---|---|
| % in volume | 52.0 | 19.2 | 5.6 | 3.2 | 20.0 |
| % by weight | 58.3 | 21.5 | 6.3 | 3.5 | 10.4 |

As will be described hereinafter, the bituminous conglomerate mixture also comprises bitumen in an amount equal to 5.5% by weight in relation to 100% by weight of the inert material.

The procedure for preparing the bituminous conglomerate mixture will be described below.

The basalt, fine gravel, basalt sand and bitumen were heated, each separately from the other ingredients, until reaching 165° C. Once a temperature of 165° C. was reached, the aforementioned ingredients were placed into a mixer, which was subsequently operated at a speed of about 80 rpm. After about one minute of mixing, the reinforcing fibers were added. After about one minute of mixing, the filler was added. After about one minute of mixing, the pre-treated ELT granules were added. After about one minute the preparation was terminated.

The mixture prepared as described above was processed for the characterization thereof, both in terms of density and in terms of mechanical parameters.

The mixture processing procedure, as well as the parameters and characterization procedures, are the same as those described above for the first bituminous conglomerate mixture.

Table V shows the results obtained for the values of the aforementioned parameters.

TABLE V

| ITS (MPa) | CTI (MPa) | ITSR (%) |
|---|---|---|
| 0.33 | 10.8 | 88 |

Table VI shows the values of the volumetric characteristics described above as a function of the revolutions of the rotary press.

TABLE VI

| no. of revolutions | % Vv | % Vb | % Vag | % VMA | % VFA | Gmb (g/cm³) | Gmm (g/cm³) | % Gmm |
|---|---|---|---|---|---|---|---|---|
| 10 | 22.3 | 9.0 | 68.7 | 31.3 | 28.8 | 1.763 | 2.269 | 77.68 |
| 50 | 16.9 | 9.6 | 73.4 | 26.6 | 36.2 | 1.885 | 2.269 | 83.05 |
| 130 | 14.4 | 9.9 | 75.7 | 24.3 | 40.9 | 1.943 | 2.269 | 85.63 |

From the data shown in tables II, III, V and VI, anyone skilled in the art can recognize that the asphalt deriving from the method, the object of the present invention, satisfies all of the requisites required in order to be used effectively.

The method, object of the present invention, offers the significant advantage of allowing for the use of a significant quantity of ELT rubber granules. This advantage derives from having modified the ELT rubber granules in order to be able to treat them in the same way as stone material.

The method, object of the present invention, also offers the advantage of avoiding the high temperature dissolving operation of granules deriving from ELT within the bitumen, with the obvious benefits that this entails in terms of safety for operators.

The results of the water sensitivity tests performed on the conglomerate mixtures obtained according to the present invention demonstrate a significant advantage in relation to the possibility of introducing high percentages of granules deriving from ELT into bituminous conglomerates, without the need to use high percentages of bitumen. The consequent improvement in the environmental sustainability of pavements that imply the reuse of granules deriving from ELT is evident if we consider that, to date, the state of the art concerning rubber powder mixtures provides for the use of contents of bitumen greater than or equal to 8% for percentages of granules deriving from ELT of only 2% by weight.

The invention claimed is:

1. A method for producing asphalt comprising:
   a heat treatment step, wherein first rubber granules deriving from an end-of-life tire granulation process are subjected to a temperature of between 8° and 300° C., for a period of time such that second rubber granules are obtained with a density of between 1.0 and 1.5 g/cm³; and
   a mixing step wherein the second rubber granules are mixed with stone aggregate and bitumen to obtain asphalt,
   wherein the mixing step comprises a first mixing operation wherein the stone aggregate and the bitumen are mixed together at a temperature of between 15° and 200° C., and a second mixing operation wherein the second rubber granules are added to the mixture from the first mixing operation.

2. The method of claim 1, wherein during the heat treatment step the first rubber granules are subjected to a temperature of between 100 and 200° C., for a period of time such that the second rubber granules are obtained with a density of between 1.2 and 1.3 g/cm³.

3. The method of claim 1, wherein the second rubber granules constitute from 1 to 30% by volume of a quantity of inert material comprised within the asphalt.

4. The method of claim 1, wherein the first rubber granules have a substantially polyhedral conformation, wherein a ratio between a maximum size and a minimum size thereof is less than 2.

5. The method of claim 1, wherein the first rubber granules have dimensions to pass through a sieve having meshes with dimensions of between 10 mm and 1.5 mm.

6. The method of claim 1, wherein the first rubber granules have dimensions to pass through a sieve having meshes with dimensions of between 2.0 mm and 6.0 mm.

7. The method of claim 1, comprising a preliminary thermal step preceding the heat treatment step, wherein rubber granules are subjected to a temperature of between 120 and 200° C. for a period of time of between 15 and 30 h.

8. The method of claim 1, comprising a surface treatment step, subsequent to the heat treatment step and wherein the second rubber granules from the heat treatment step are subjected to a surface abrasion operation.

9. The method of claim 8, comprising a final heat treatment step subsequent to the surface treatment step and preceding the mixing step, wherein during the final heat treatment step the rubber granules deriving from the surface treatment step are subjected to a temperature of between 8° and 300° C. for a period of time to obtain rubber granules with a density of between 1.0 and 1.5 g/cm³.

10. The method of claim 9, wherein during the final heat treatment step the rubber granules deriving from the surface treatment step are subjected to a temperature of between 100 and 200° C. for a period of time to obtain rubber granules with a density of between 1.2 and 1.3 g/cm³.

11. Asphalt manufactured using the method of claim 1.

12. Rubber granules and/or powder deriving from an end-of-life tire granulation process, which have dimensions to pass through a sieve having meshes with dimensions up to 10 mm and that are subjected during a heat treatment step to a temperature of between 8° and 300° C. for a period of time to obtain rubber granules and/or powder with a density of between 1.0 and 1.5 g/cm³, further subjected to a mixing step comprising a first mixing operation wherein the stone aggregate and the bitumen are mixed together at a temperature of between 150 and 200° C., and a second mixing operation wherein the second rubber granules are added to the mixture from the first mixing operation.

13. The rubber granules and/or powder of claim 12, further subjected to a preliminary thermal step, preceding the heat treatment step, and wherein the rubber granules and/or powder deriving from the granulation process are subjected to a temperature of between 120 and 200° C. for a period of time of between 15 and 30 h.

14. The rubber granules and/or powder of claim 12, further subjected to a surface treatment step, subsequent to the heat treatment step, and wherein the rubber granules and/or powder from the heat treatment step are subjected to a surface abrasion operation.

15. The rubber granules and/or powder of claim 14, further subjected to a final heat treatment step subsequent to the surface treatment step, wherein during the final heat treatment step the rubber granules and/or powder deriving from the surface treatment step are subjected to a temperature of between 80 and 300° C. for a period of time to obtain rubber granules and/or powder with a density of between 1.0 and 1.5 g/cm³.

16. A method for producing asphalt comprising:

a heat treatment step, wherein first rubber granules deriving from an end-of-life tire granulation process are subjected to a temperature of between 8° and 300° C., for a period of time such that second rubber granules are obtained with a density of between 1.0 and 1.5 g/cm³; and a mixing step wherein the second rubber granules are mixed with stone aggregate and bitumen to obtain asphalt, wherein the second rubber granules constitute from 1 to 30% by volume of a quantity of inert material comprised within the asphalt.

* * * * *